Jan. 24, 1950 J. R. YOUNG ET AL 2,495,621
FISHING REEL
Filed Oct. 16, 1945 2 Sheets-Sheet 1
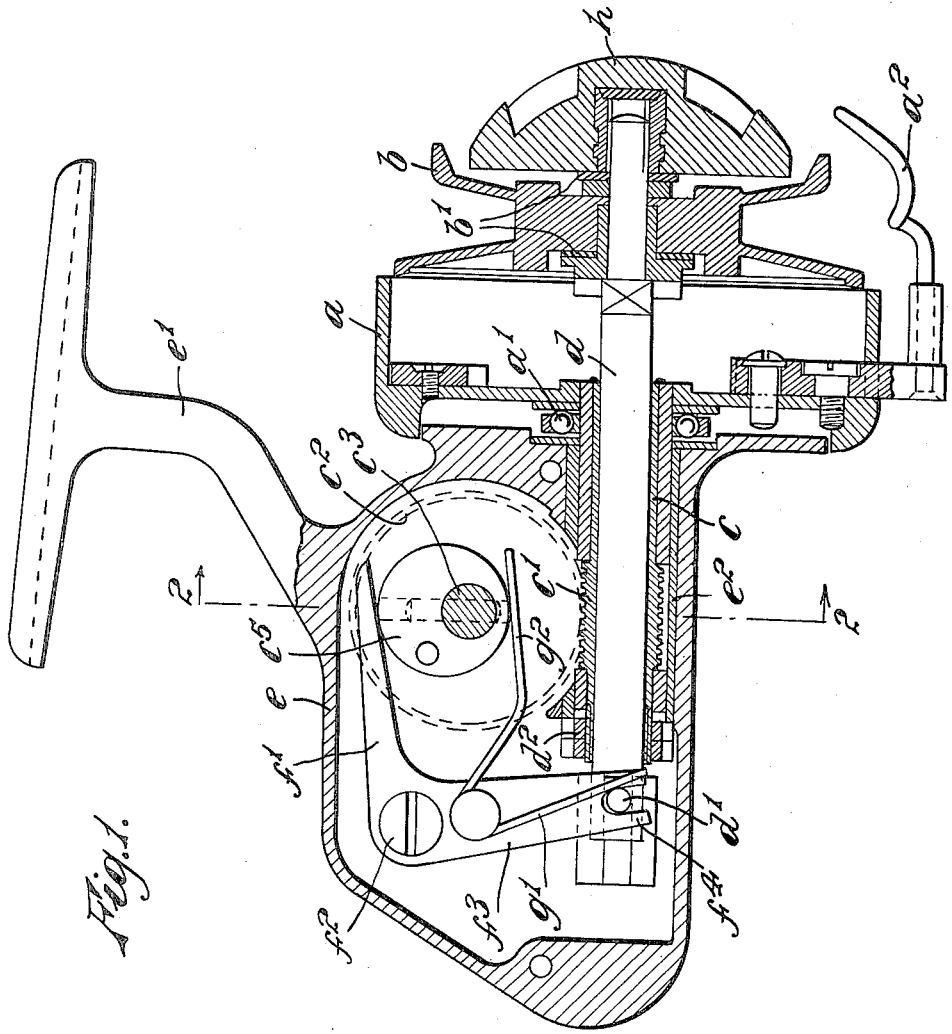
James Robert Young
Howard Young
Edward Emlyn Young
Inventors
by Marshall & Marshall
Attorneys

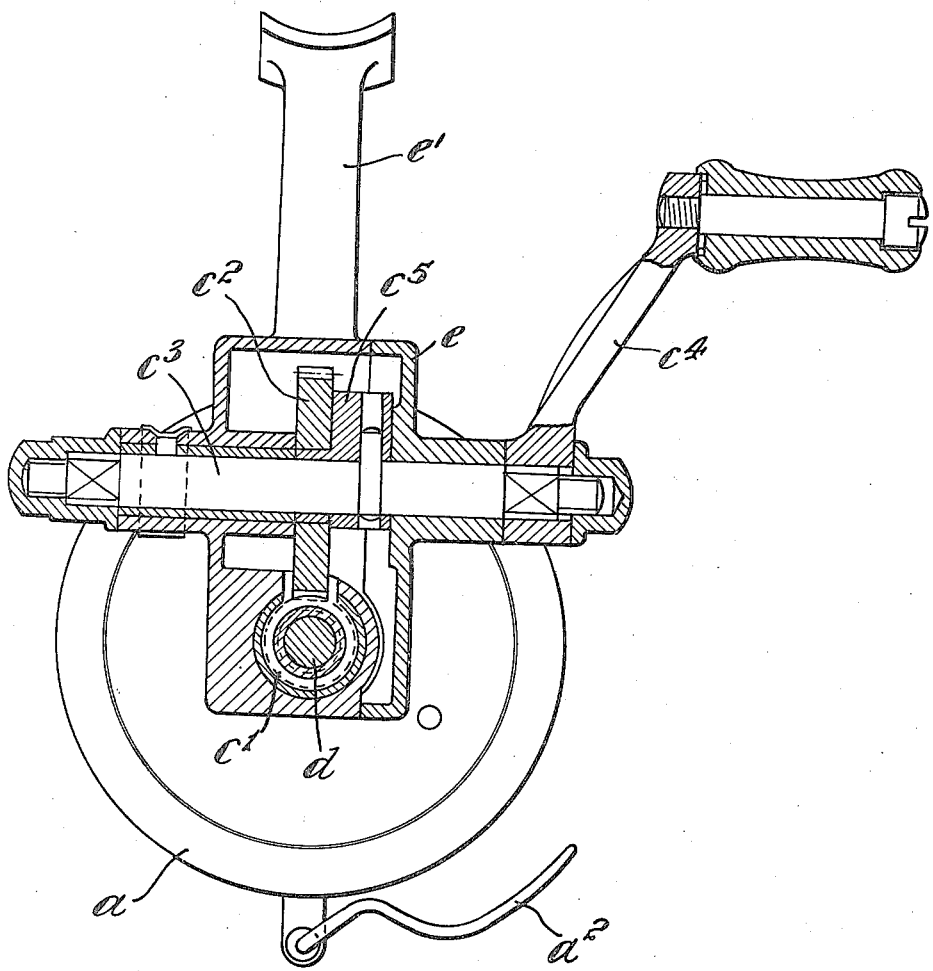

Patented Jan. 24, 1950

2,495,621

UNITED STATES PATENT OFFICE 2,495,621

FISHING REEL

James Robert Young, Howard Young, and Edward Emlyn Young, Redditch, England, assignors to J. W. Young & Sons Limited, Redditch, England, a British company Application October 16, 1945, Serial No. 622,586
In Great Britain October 16, 1944

2 Claims. (Cl. 242—84.4)

This invention has reference to improvements in or connected with fishing reels, and has for its object to provide a simplified and improved means of effecting the desired rotary travel and reciprocal motion of the drum casing, flyer, and line drum forming integers of the reel to admit of the necessary winding and unwinding of the line, and further to provide a means whereby a right or left hand wind may be achieved as may be desired.

The invention consists of a fishing reel operative mechanism characterised by a toothed wheel transmission for the rotatable drum casing and an eccentric and bellcrank motion transmission for effecting a longitudinal reciprocal motion of the line drum relative to said casing in synchrony with the rotational motion of the drum casing and the flyer mounted thereon, and means advantageously whereby an optional right or left hand wind from a common driving spindle can be effected.

In order that this invention may be clearly understood and readily carried into practice, reference may be had to the appended explanatory drawings, in which—

Fig. 1 illustrates in longitudinal elevation a fishing reel mechanism constructed according to the present invention, and Fig. 2 is a vertical sectional elevation taken on line 2—2 of Fig. 1.

According to the preferred means of carrying the present invention into practice, the rotatable drum casing $a$ within part of which the line drum $b$ is containable, is mounted on a sleeve $c$ to which a worm $c^1$ is connected, and the sleeve is rotatable about a spindle $d$ which may be termed the worm spindle, and this spindle has guided bearing within a housing $e$ adapted to be secured by an integral bracket arm $e^1$ to the handle of the fishing rod in accordance with the usual practice.

The worm $c^1$ meshes with a worm wheel $c^2$ mounted on a rotatable spindle $c^3$ laterally extending through the sides of the housing $e$ (see Fig. 2) and to one or other end of this spindle $c^3$ can be secured at option the winding handle or crank $c^4$ according to whether a left or right hand wind is required. Mounted on this spindle $c^3$ and abutting one face of the worm wheel $c^2$ is an eccentric $c^5$ and resting on the periphery of this eccentric is the end of one arm $f^1$ of a bellcrank lever pivotally mounted on a transverse pin $f^2$ located within the said housing. The other arm $f^3$ of this bellcrank lever is forked at $f^4$ and engages a pin $d^1$ which extends laterally from the one end of the reciprocal worm spindle $d$. The said pin $d^1$ may also be adapted to extend in the opposite direction from the worm spindle and this extension may be located within a guideway bearing formed as part of the said housing $e$.

One arm of the bellcrank lever is acted upon by one limb $g^1$ of a lock or blade spring the other arm $g^2$ of which co-acts with the eccentric $c^5$ to take up any slack between the eccentric $c^5$ and the worm spindle $d$.

The worm $c^1$ which is connected to the sleeve $c$ on which the rotatable drum casing $a$ is rotatably mounted is carried by an anti-friction ball thrust bearing $a^1$ mounted within the said housing, and also mounted about the spindle $d$ is a rotatable positioning collar $d^2$ one face of which bears against the one end of a bearing bush $e^2$ forming an integral part of the said housing $e$ and extending from an end wall thereof.

The rotatable drum casing $a$ has extending from the periphery thereof the flyer $a^2$ which extends over the line drum $b$ to which drum a rapid reciprocal motion can be imparted by the rotary motion of the winding handle $c^4$ through the medium of the eccentric $c^5$ mounted on the driving shaft $c^3$, the rotation of the eccentric $c^5$ imparts a rocking motion to the bellcrank lever $f^1f^3$ which in turn imparts a longitudinal reciprocal motion to the spindle $d$ through the worm $c^1$ to the line drum $b$, so that simultaneous with the rotational motion of the drum casing $a$ and the flyer $a^2$ effected through the medium of the driving spindle $c^3$, worm wheel $c^2$, worm $c^1$ and worm sleeve $c$ a reciprocal linear motion is imparted to the line drum $b$ to effect the requisite control of the line which is being wound on or drawn off the line drum.

The line drum $b$ is mounted upon the spindle $d$ in frictional manner by virtue of a friction washer $b^1$ and is held in place by a screw cap $h$.

We claim:

1. A fishing reel comprising, in combination, a casing, a spindle rotatably and slidably journalled in said casing with one of its ends extending exteriorly thereof, a line drum mounted on the outer end of said spindle, a driving shaft journalled in said casing transversely relative to said spindle, the ends of said shaft both extending exteriorly of said casing, high ratio drive means operatively connecting said shaft and said spindle, a disc eccentrically mounted on said shaft, a bell crank pivotally mounted on an axis parallel to the axis of said driving shaft and having one of its arms engaged with the periphery of said disc, the other arm being connected to said spindle for reciprocating said spindle in timed relation to the rotation thereof, a leaf spring mounted on said lever and acting against said disc and the connection to said spindle in opposition to the arms of said lever for eliminating slack, a handle mountable on either end of said drive shaft and a cap for the other end of said drive shaft.

2. Drive means for a fishing reel having a casing and line drum mounted on a rotatable and slidable spindle journalled in said casing comprising, in combination, a drive shaft journalled in said casing with both its ends extending exteriorly thereof and transversely to said spindle, worm and gear driving means for rotating said spindle upon rotation of said shaft, a collar rotatably mounted on the inner end of said spindle, a disc eccentrically mounted on said shaft, a bell crank pivotally mounted in said casing, one arm of said bell crank being engaged with the periphery of said disc and the other arm of said bell crank being bifurcated and engaged with said collar, a leaf spring mounted on said crank near its pivot and having two arms, one of said arms engaging the periphery of said disc on the side diametrically opposed from the arm of said bell crank and the other one of the arms of said leaf spring engaging said collar in opposition to the other arm of said bell crank, and a handle and a cap, interchangeably mountable on either end of said shaft.

JAMES ROBERT YOUNG.
HOWARD YOUNG.
EDWARD EMLYN YOUNG.

REFERENCES CITED

The following references are of record in the file of this patent:

UNITED STATES PATENTS

| Number | Name | Date |
| --- | --- | --- |
| 1,941,739 | Crawford | Jan. 2, 1934 |
| 2,314,616 | Gaire | Mar. 23, 1943 |

FOREIGN PATENTS

| Number | Country | Date |
| --- | --- | --- |
| 373,786 | Great Britain | June 2, 1932 |
| 389,622 | Great Britain | Mar. 23, 1933 |
| 828,000 | France | Feb. 2, 1938 |